(12) United States Patent
Wang

(10) Patent No.: US 11,118,925 B2
(45) Date of Patent: Sep. 14, 2021

(54) NAVIGATION SYSTEM WITH CARRYOVER MECHANISM AND METHOD OF OPERATION THEREOF

(71) Applicant: Telenav, Inc., Santa Clara, CA (US)

(72) Inventor: Liang Wang, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 272 days.

(21) Appl. No.: 15/870,911

(22) Filed: Jan. 13, 2018

(65) Prior Publication Data

US 2019/0219415 A1 Jul. 18, 2019

(51) Int. Cl.
*G01C 21/36* (2006.01)
*G06F 16/29* (2019.01)
*G06F 16/248* (2019.01)
*G06F 16/28* (2019.01)
*G06F 16/9537* (2019.01)
*G06F 16/2457* (2019.01)

(52) U.S. Cl.
CPC ..... *G01C 21/3605* (2013.01); *G01C 21/3682* (2013.01); *G06F 16/248* (2019.01); *G06F 16/24575* (2019.01); *G06F 16/24578* (2019.01); *G06F 16/285* (2019.01); *G06F 16/29* (2019.01); *G06F 16/9537* (2019.01)

(58) Field of Classification Search
CPC .................................................. G01C 21/3611
See application file for complete search history.

(56) References Cited

U.S. PATENT DOCUMENTS

| | | | |
|---|---|---|---|
| 7,685,144 B1 | 3/2010 | Katragadda | |
| 8,762,053 B1* | 6/2014 | Lehman | G01C 21/20 |
| | | | 701/438 |
| 9,443,036 B2 | 9/2016 | Sood et al. | |
| 9,532,176 B1* | 12/2016 | Gordon | G06F 16/248 |
| 2013/0232006 A1* | 9/2013 | Holcomb | G06F 16/951 |
| | | | 705/14.54 |
| 2014/0123062 A1* | 5/2014 | Nguyen | G01C 21/3682 |
| | | | 715/810 |
| 2014/0207748 A1 | 7/2014 | Sood et al. | |
| 2014/0359510 A1* | 12/2014 | Graf | G01C 21/3614 |
| | | | 715/771 |
| 2015/0161271 A1* | 6/2015 | Gur | G06F 16/9537 |
| | | | 707/728 |
| 2015/0161291 A1* | 6/2015 | Gur | G06F 16/904 |
| | | | 707/722 |
| 2019/0033084 A1* | 1/2019 | Chen | G01C 21/3438 |

\* cited by examiner

*Primary Examiner* — Thomas G Black
*Assistant Examiner* — Sara J Lewandroski
(74) *Attorney, Agent, or Firm* — Perspectives Law Group, Corp.

(57) ABSTRACT

A method of operation of a navigation system includes determining a request classification based on a keyword included in a user request; generating a search result including the request classification with a control unit for presenting on a device; determining a retry classification based on the keyword included in a retry request; generating a carryover result based on the retry classification, the request classification, or a combination thereof to carryover a user's intent from the user request to correlate the carryover result with the search result; and generating an autosuggestion based on the carryover result for presenting on the device.

20 Claims, 6 Drawing Sheets

NAVIGATION SYSTEM WITH CARRYOVER MECHANISM AND METHOD OF OPERATION THEREOF

TECHNICAL FIELD

The present invention relates generally to a navigation system, and more particularly to a system with carryover mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving a mechanism to control an operation of search has become a paramount concern for the consumer. The inability decreases the benefit of using the tool.

Thus, a need still remains for a navigation system with carryover mechanism to a device during operation of vehicle. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a request classification based on a keyword included in a user request; generating a search result including the request classification with a control unit for presenting on a device; determining a retry classification based on the keyword included in a retry request; generating a carryover result based on the retry classification, the request classification, or a combination thereof to carryover a user's intent from the user request to correlate the carryover result with the search result; and generating an autosuggestion based on the carryover result for presenting on the device.

The present invention provides a navigation system, including: a control unit for: determining a request classification based on a keyword included in a user request; generating a search result including the request classification with a control unit for presenting on a device; determining a retry classification based on the keyword included in a retry request; generating a carryover result based on the retry classification, the request classification, or a combination thereof to carryover a user's intent from the user request to correlate the carryover result with the search result; generating an autosuggestion based on the carryover result; and a communication unit, coupled to the control unit, for transmitting the autosuggestion for presenting on the device.

The present invention provides a navigation system having a non-transitory computer readable medium including instructions for execution, the instructions comprising: determining a request classification based on a keyword included in a user request; generating a search result including the request classification for presenting on a device; determining a retry classification based on the keyword included in a retry request; generating a carryover result based on the retry classification, the request classification, or a combination thereof to carryover a user's intent from the user request to correlate the carryover result with the search result; and generating an autosuggestion based on the carryover result for presenting on the device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
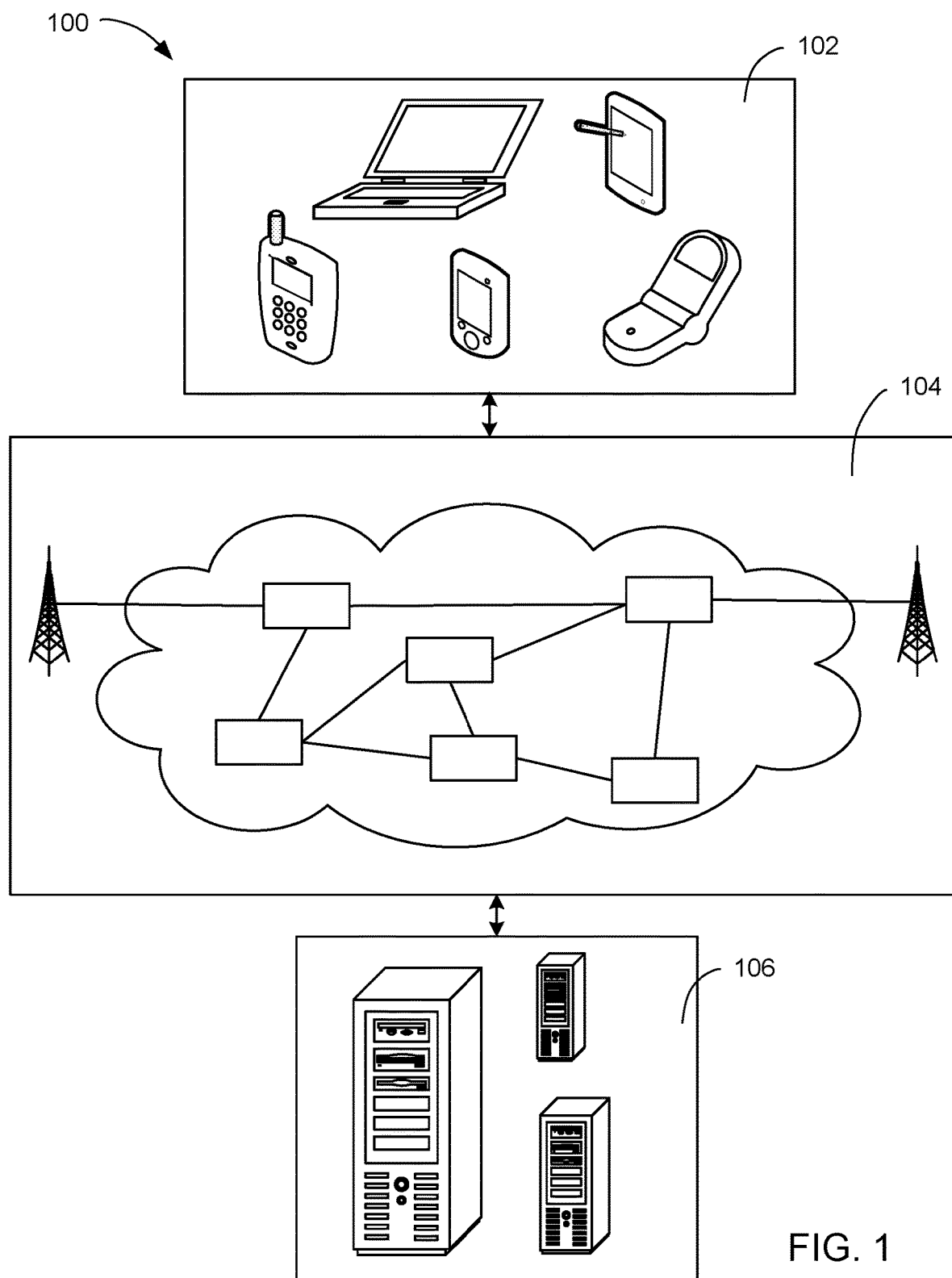
FIG. 1 is a navigation system with carryover mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with carryover mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, a head unit, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
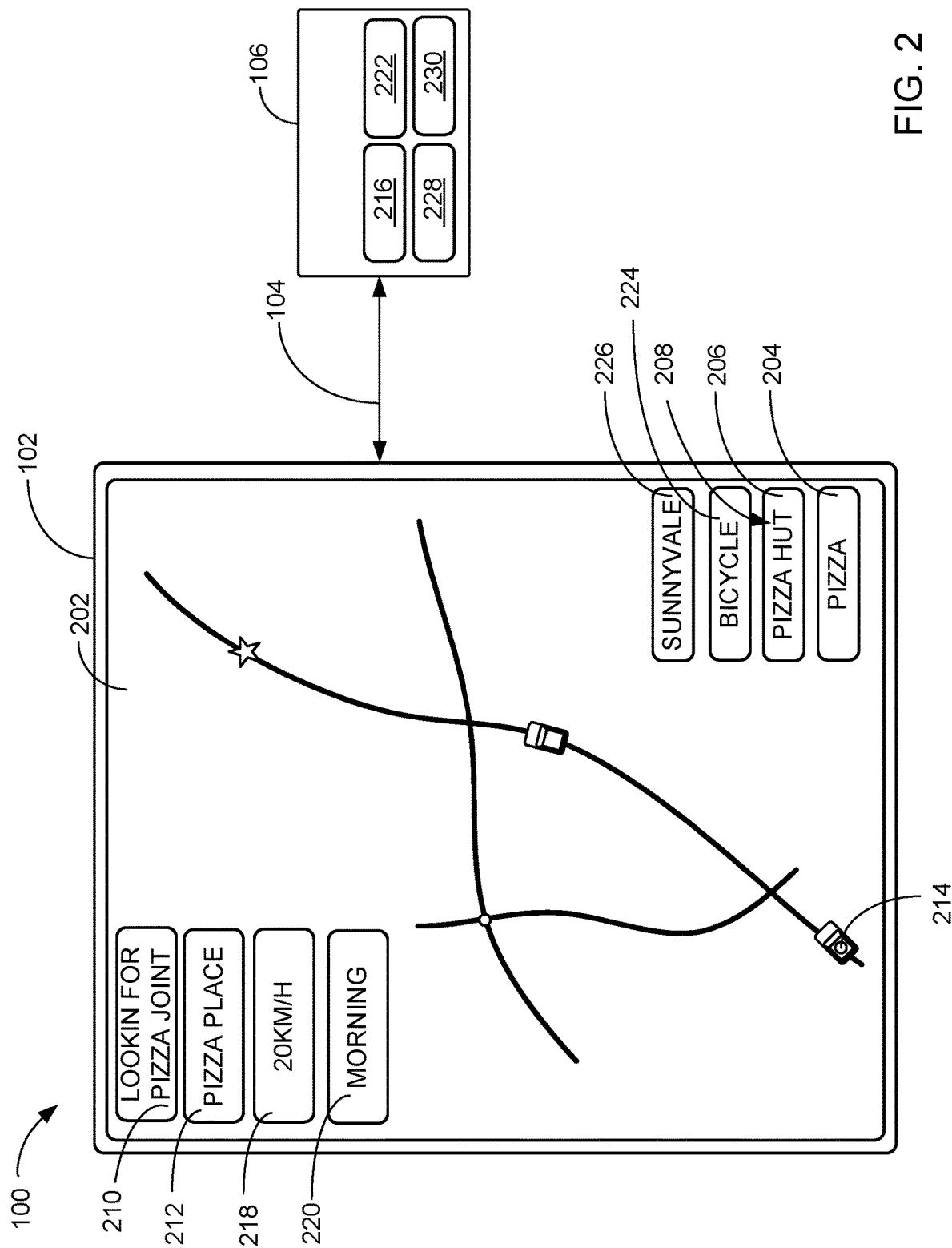
FIG. 2 is an example of a request factor.

Referring now to FIG. 2, there is shown an example of a request context 202. For clarity and brevity, the discussion of the embodiment of the present invention will focus on the first device 102 delivering the result generated by the navigation system 100. However, the second device 106 and the first device 102 can be discussed interchangeably. The first device 102 and the second device 106 can communicate via the communication path 104.

The request context 202 is defined as a situation or condition surrounding when user's making a user request 204. The user request 204 is defined as a user's action for demanding the navigation system 100 to generate a search result 206. For example, the user request 204 can be made by voice entry, manual entry, gesture entry, or a combination thereof. The search result 206 is defined as an output generated by the navigation system 100 in response to the user request 204.

The user request 204 can include a keyword 208. The keyword 208 can represent a word, a phrase, or a combination thereof. For example, the keyword 208 can represent a word that indicates that a user's intent 210 is searching for a place to eat. For another example, the keyword 208 can represent a combination of words or a phrase to indicate that the user request 204 is intended for researching travel information. The user's intent 210 is defined as user's purpose for making the user request 204 to the navigation system 100.

A request classification 212 is defined as a categorization of the user request 204. For example, if the user request 204 can include the keyword 208 related to restaurant, the navigation system 100 can determine the request classification 212 for the user request 204 to represent a search for a place to eat. For a different example, if the user request 204 can include the keyword 208 represent a brand for clothing, the navigation system 100 can determine the request classification 212 for the user request 204 to represent a search for shopping.

The request context 202 can include a current location 214, a user profile 216, a travel speed 218, a time period 220, an activity history 222, a travel mode 224, a geographic area 226, or a combination thereof. The current location 214 is defined as a physical location of the first device 102. For example, the current location 214 can indicate where in the geographic area 226 the user with the first device 102 is currently located. The current location 214, the geographic area 226, or a combination thereof can indicate where the user request 204 is made to the navigation system 100.

The time period 220 is defined as time information. For example, the time period 220 can indicate when the user request 204 is made to the navigation system 100. For further example, the time period 220 can represent the second, minute, hour, day, week, month, year, season, or a combination thereof. The user profile 216 is defined as information regarding the user of the first device 102. For example, the user profile 216 can include personal information such as age, sex, profession, preference, or a combination thereof.

The activity history 222 is defined as record of the user's activity. The activity history 222 can include all of the user's activity performed on the navigation system 100. For example, the activity history 222 can include the time period 220 when the user request 204 was made. For a different example, the activity history 222 can include the geographic area 226 where the user request 204 was made. For another example, the activity history 222 can include the keyword 208 entered for the user request 204.

A trained data 228 is defined as information used to compare against the keyword 208 to determine the categorization of the user request 204. For example, the navigation system 100 can store the trained data 228. For further example, the trained data 228 can represent the information analyzed by the navigation system 100 to determine the categorization of a user's activity. The trained data 228 can include the activity history 222.

The travel mode 224 is defined as a transportation method. For example, the travel mode 224 can include walking, public transportation, personal transportation, or a combination thereof. For further example, the travel mode 224 can include ground transportation, air transportation, or water transportation. The travel speed 218 is defined a rate of motion. For example, the travel speed 218 can represent how fast the user is traveling in the travel mode 224.

A category of interest 230 is defined as a classification of an item. The item can include a point of interest, geographic location, brand, activity, cuisine, service, or a combination thereof. For example, the category of interest 230 can include a type of restaurant such as Chinese, French, Italian, or Japanese. For further example, the search result 206 can include the category of interest 230 for various items. For further example, the keyword 208 can represent the category of interest 230. As a result, the request classification 212 can be categorized according to the category of interest 230.

Figure 3:
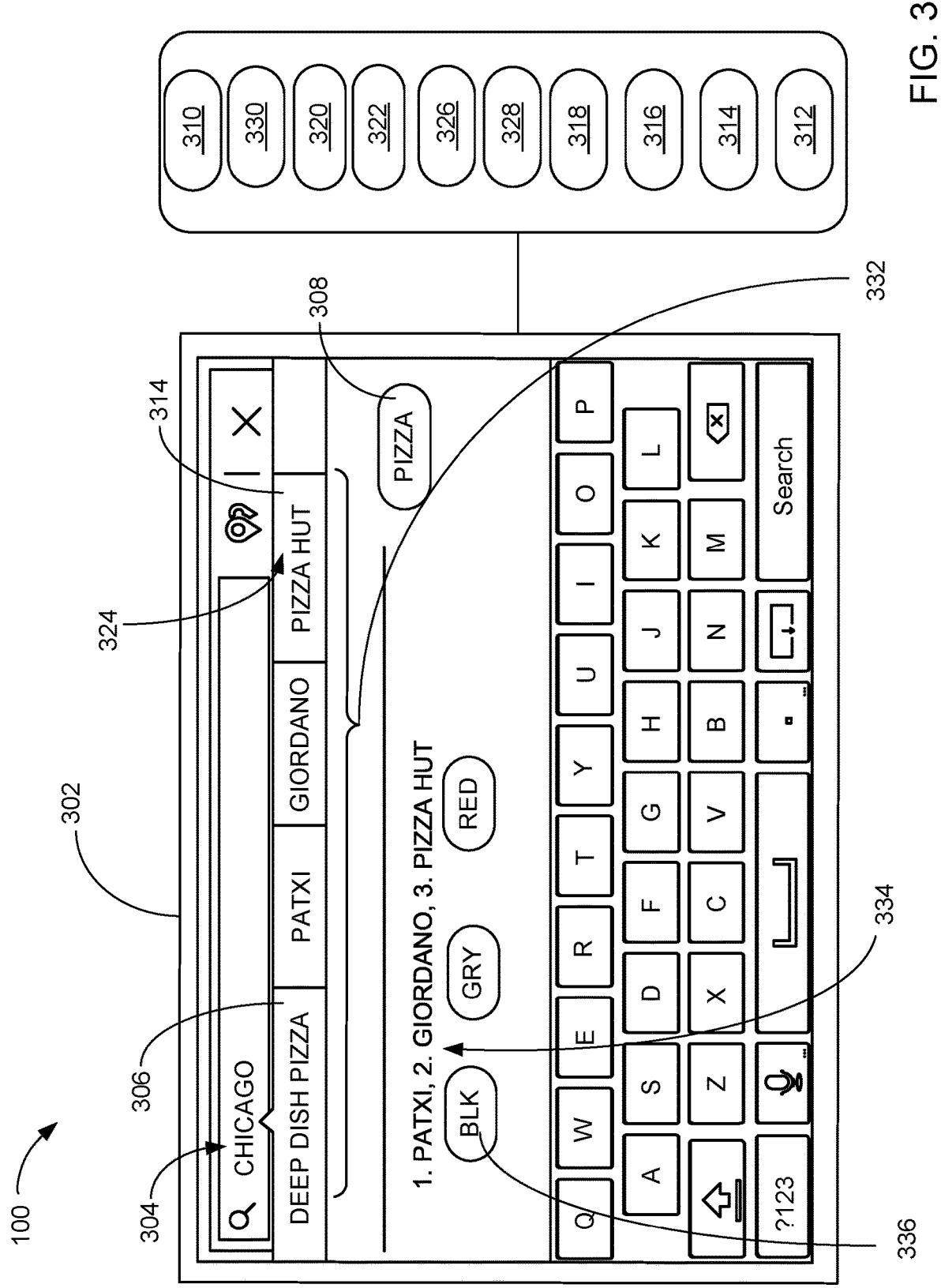
FIG. 3 is an example of a carryover context.

Referring now to FIG. 3, there is shown an example of a carryover context 302. The carryover context 302 is defined as a situation or condition which indicates that the user intended to continue the user's intent 210 of FIG. 2 for search. For example, the user's intent 210 can represent a user's reason behind making the user request 204 of FIG. 2 to the navigation system 100. For further example, the carryover context 302 can represent to the situation or condition to carryover the user's intent 210 in a retry request 304 for the navigation system 100 to generate a carryover result 306 correlated to the user request 204, the search result 206 of FIG. 2, or a combination thereof.

The retry request 304 is defined as user's action for demanding the navigation system 100 to generate the carryover result 306. The retry request 304 can represent a new search that is independent and different from the user request 204. For example, the retry request 304 can include the keyword 208 of FIG. 2 not entered in the user request 204. For further example, the retry request 304 can be made by voice entry, manual entry, gesture entry, or a combination thereof. The retry request 304 can include the keyword 208. The carryover result 306 is defined as an output dependent to the user request 204, the search result 206, or a combination thereof.

A retry classification 308 is defined as a categorization of the retry request 304. For example, the retry classification 308 can represent the same type of categorization as the request classification 212 of FIG. 2 for the user request 204. For further example, the retry classification 308 can represent the category of interest 230 carried over from the user request 204.

The carryover context 302 can include a travel distance 310, a carryover distance 312, an idle period 314, a carryover period 316, a difference level 318, or a combination thereof. The travel distance 310 is defined as an amount of physical space traveled. For example, the travel distance 310 can represent the distance traveled between the previous instance of the current location 214 and the current location. The carryover distance 312 is defined as a threshold distance to carryover the user's intent 210 from the user request 204, the search result 206, or a combination thereof. For example, if the travel distance 310 is within the carryover distance 312, the navigation system 100 can determine that the user's intent 210 must or should be carried over to the retry request 304. The carryover distance 312 can be adjusted by increasing or decreasing the value.

The idle period 314 is defined as a length of time of a user's inactivity. For example, the idle period 314 can represent the length of time between the user request 204 and retry request 304. More specifically as an example, after the user makes the user request 204, the user can perform no activity on the navigation system 100. The idle period 314 can represent the time of no activity performed on the navigation system 100. The carryover period 316 is defined as a threshold time length to carryover the user's intent 210 from the user request 204, the search result 206, or a combination thereof. For example, if the idle period 314 is within the carryover period 316, the navigation system 100 can determine that the user's intent 210 must or should be carried over to the retry request 304. The carryover period 316 can be adjusted by increasing or decreasing the value.

The difference level 318 is defined a difference degree between two values. For example, the difference level 318 between the travel distance 310 and the carryover distance 312 can be measured in physical distance. For another example, the difference level 318 between the idle period 314 and the carryover period 316 can be measured in time duration. More specifically as an example, the difference level 318 can be granularly measured in percentage difference.

An attribute priority 320 is defined as an order of importance. For example, each factor of the request context 202 of FIG. 2, the carryover context 302, or a combination thereof can be prioritized according to the attribute priority 320. More specifically as an example, the attribute priority 320 can include a priority score 322, which is defined as a value to order the attribute priority 320. For example, the priority score 322 can represent an alphanumeric value. For a specific example, the priority score 322 can represent a number between 0 to 10 with 0 representing a lowest value and 10 representing a highest value. As a result, the attribute priority 320 for each factor of the request context 202, the carryover context 302, or a combination thereof can be ordered according to the value of the priority score 322.

An autosuggestion 324 is defined as a candidate result predicting a desired result. The autosuggestion 324 can be generated for the search result 206, the carryover result 306, or a combination thereof. For example, the navigation system 100 can generate the autosuggestion 324 as the user enters each letter for the user request 204, the retry request 304, or a combination thereof to the navigation system 100. More specifically as an example, as the user enters more letter, the navigation system 100 can update the autosuggestion 324 dynamically and in real-time.

A carryover type 326 is defined as a classification of the autosuggestion 324. For example, the carryover type 326 can include a carryover suggestion 328, a carryover category 330, or a combination thereof. The carryover suggestion 328 can represent the instance of the autosuggestion 324 generated based on the carryover result 306. The carryover category 330 can represent the instance of the autosuggestion 324 generated based on the retry classification 308.

A suggestion list 332 is defined as a set of instances of the autosuggestion 324. For example, the suggestion list 332 can include multiple instances of the autosuggestion 324 where each of the autosuggestion 324 can be different from one another. For a specific example, the suggestion list 332 can be displayed as a dropdown list, a popup window, audio read out, or a combination thereof.

A suggestion ranking 334 is defined as a standing that orders the multiple instances of the autosuggestion 324. For example, one instance of the autosuggestion 324 can have a higher rank than another instance of the autosuggestion 324.

A coloration 336 is defined as a color arrangement of a result. The color arrangement can be defined according to the Red Green Blue (RGB) color code. For example, the search result 206, the carryover result 306, the autosuggestion 324, or a combination thereof can each have the coloration 336 different or same from one another. For further example, the coloration 336 of each letter can be different from one another. For a different example, the coloration 336 for each instance of the autosuggestion 324 can be different from one another. For additional example, the coloration 336 can represent different level of shades of the color.

Figure 4:
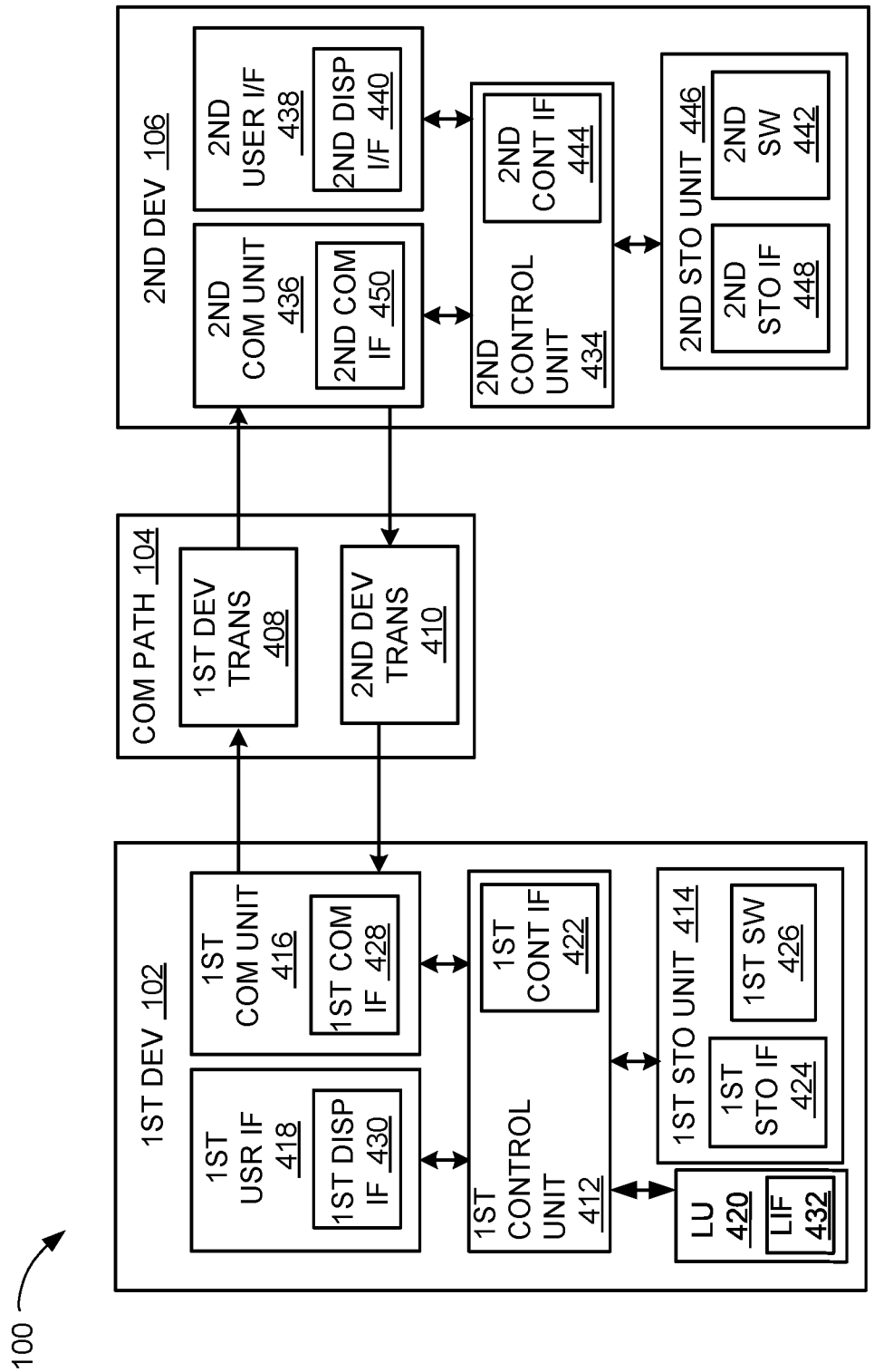
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104.

The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
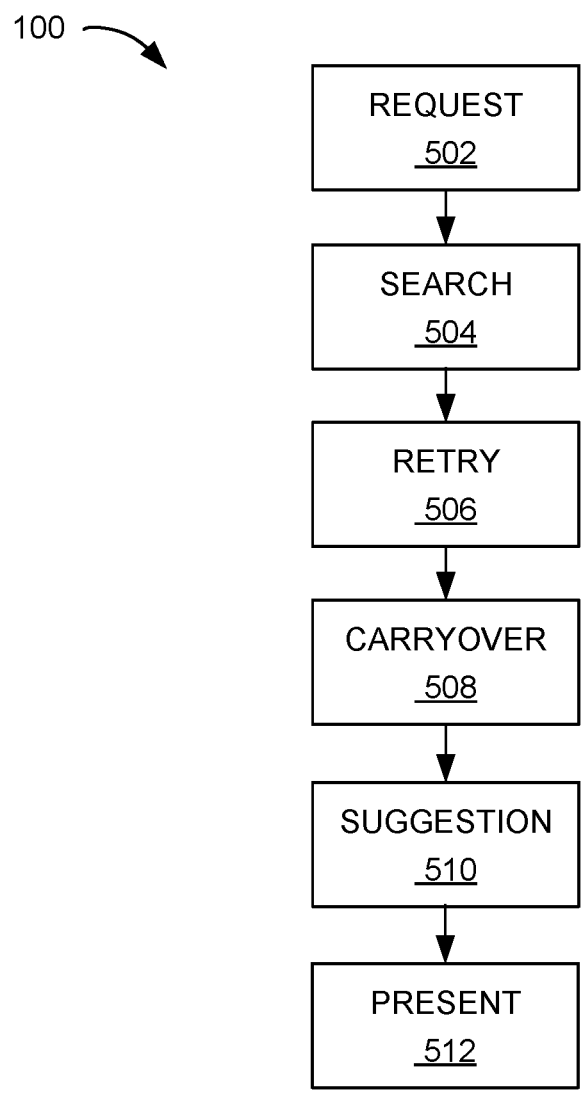
FIG. 5 is a control flow of the navigation system.

Referring now to FIG. 5, therein is shown a control flow of the navigation system 100. The navigation system 100 can include a request module 502. The request module 502 determines the request classification 212 of FIG. 2. For example, the request module 502 can determine the request classification 212 based on the user request 204 of FIG. 2, the category of interest 230 of FIG. 2, the trained data 228 of FIG. 2, or a combination thereof.

The request module 502 can determine the request classification 212 in a number of ways. For example, the request module 502 can receive the user request 204 entered by the user to the navigation system 100. The request module 502 can determine the request classification 212 based on the keyword 208 of FIG. 2 or multiple instances of the keyword 208 within the user request 204. More specifically as an example, the request module 502 can parse the keyword 208 or combination of multiple instances of the keyword 208 within the user request 204 using natural language process algorithm.

For further example, the request module 502 can compare the keyword 208 or the combination of multiple instances of the keyword 208 to the trained data 228 stored in the first storage unit 414 of FIG. 4, the second storage unit 446 of FIG. 4, or a combination thereof. The trained data 228 can be categorized according to the category of interest 230. The request module 502 can determine the request classification 212 based on determining the category of interest 230 of the user request 204.

For a specific example, the user request 204 can represent "Pizza Hut™." The trained data 228 representing the keyword 208 of "Pizza" can be categorized under the category of interest 230 for a type of food. The trained data 228 representing the keyword 208 of "Hut" can be categorized under the category of interest 230 of a type of place or shelter. Based on the combination of the keyword 208, the request module 502 can determine the request classification 212 of "Pizza Hut™" as a place or restaurant to have pizza. The request module 502 can transmit the request classification 212 to a search module 504.

The navigation system 100 can include the search module 504, which can be coupled to the request module 502. The search module 504 generates the search result 206 of FIG. 2. For example, the search module 504 can generate the search result 206 or multiple instances of the search result 206 based on the request classification 212, the user request 204, the request context 202 of FIG. 2, or a combination thereof.

The search module 504 can generate the search result 206 in a number of ways. For example, the search module 504 can generate the search result 206 based on the request classification 212. Continuing with the previous example, the request classification 212 of the user request 204 can represent a place to eat pizza. The request context 202 can represent that the current location 214 of FIG. 2 of the user with the first device 102 of FIG. 1 can be detected by the location unit 420 of FIG. 4 at downtown metropolitan area. More specifically as an example, the search module 504 can collect the information related to request context 202 including the current location 214 dynamically and in real-time of the first device 102 detected within the geographic area 226 of FIG. 2. The unique distributed architecture of the present invention allows the first device 102 to efficiently and accurately detect the current location 214 of the user and transmit the request context 202 to the second device 106 of FIG. 1 through the communication path 104 of FIG. 1 for the search module 504 to generate the search result 206. The search module 504 can generate the search result 206 including a name or names of the pizza restaurants including "Pizza Hut™" in the downtown metropolitan area.

For additional example, the search module 504 can generate the search result 206 based on the request context 202 including the time period 220 of FIG. 2. The time period 220 can represent 9 am. Continuing with the example, the search module 504 can generate the search result 206 for the pizza restaurant that is open at 9 am. The search module 504 can transmit the search result 206 to a retry module 506.

The navigation system 100 can include the retry module 506, which can be coupled to the search module 504. The retry module 506 determines the retry classification 308 of FIG. 3. For example, the retry module 506 can determine the retry classification 308 based on the retry request 304 of FIG. 3, the user request 204, the category of interest 230, the trained data 228, the request classification 212, or a combination thereof.

The retry module 506 can determine the retry classification 308 in a number of ways. For example, the retry module 506 can determine the retry classification 308 similarly to the request module 502 determining the request classification 212. More specifically as an example, the retry module 506 can receive the retry request 304 entered by the user of the navigation system 100. The retry module 506 can determine the retry classification 308 based on the keyword 208 or multiple instances of the keyword 208 within the retry request 304. More specifically as an example, the retry module 506 can parse the keyword 208 or combination of multiple instances of the keyword 208 within the retry request 304 using natural language process algorithm.

For further example, the retry module 506 can compare the keyword 208 or the combination of multiple instances of the keyword 208 to the trained data 228 stored in the first storage unit 414, the second storage unit 446, or a combination thereof. The trained data 228 can be categorized according to the category of interest 230. The retry module 506 can determine the retry classification 308 based on determining the category of interest 230 of the retry request 304.

For another example, the retry module 506 can determine the retry classification 308 based on the request classification 212. More specifically as an example, continuing from the previous example, the request classification 212 can be determined as a place to eat pizza. The retry module 506 can determine the retry classification 308 to represent a place to eat pizza to carryover the user's intent 210 of FIG. 2 from the user request 204.

For a specific example, the retry request 304 can represent "Chicago." The trained data 228 representing the keyword 208 of "Chicago" can be categorized under the category of interest 230 for a city in the United States. Based on the keyword 208, the request module 502 can determine the retry classification 308 of "Chicago" as a city in the United States. The request module 502 can transmit the retry classification 308 to a carryover module 508.

It has been discovered that the navigation system 100 determining the retry classification 308 of the retry request 304 based on the user request 204, the request classification 212, or a combination thereof improves the efficiency of generating the carryover result 306 of FIG. 3. More specifically as an example, by factoring the user request 204 by carrying over the request classification 212, the navigation system 100 can reduce resource allocation from determining the retry classification 308 unrelated to the category of interest 230 of the user request 204. As a result, the navigation system 100 can improve the performance with additional resource for improved operation of the navigation system 100.

The navigation system 100 can include the carryover module 508, which can be coupled to the retry module 506. The carryover module 508 generates the carryover result 306. For example, the carryover module 508 can generate the carryover result 306 based on the retry classification 308, the request classification 212, the user request 204, the retry request 304, the search result 206, the request context 202, the carryover context 302 of FIG. 3, the attribute priority 320 of FIG. 3, or a combination thereof to carryover the user's intent 210. For further example, the carryover module 508 can update the carryover result 306 dynamically and in real-time based on the update of the retry classification 308, the request classification 212, the user request 204, the retry request 304, the search result 206, the request context 202, the carryover context 302, the attribute priority 320, or a combination thereof. The carryover result 306 can generate the carryover result 306 to carryover the user's intent 210 from the user request 204.

The carryover module 508 can generate the carryover result 306 in a number of ways. For example, the carryover module 508 can generate the carryover result 306 based on the search result 206, the request classification 212, the retry classification 308, or a combination thereof. Continuing with the previous example, the search result 206 can include "Pizza Hut™" and other pizza restaurants. The request classification 212 can represent pizza restaurant. The retry classification 308 can represent city of Chicago in the United States. Based on the search result 206, the request classification 212, the retry classification 308, or a combination thereof, the carryover module 508 can generate the carryover result 306 by comparing the retry request 304 and the user request 204 to the trained data 228 to identify the category of interest 230 representing "Chicago style pizza" for the carryover result 306.

For a different example, the carryover module 508 can generate the carryover result 306 based on the request context 202 including the current location 214, the user profile 216 of FIG. 2, the time period 220, the travel mode 224 of FIG. 2, the activity history 222 of FIG. 2, or a combination thereof. For further example, the carryover module 508 can update the carryover result 306 dynamically and in real-time based on the change in the request context 202. More specifically as an example, the carryover module 508 can collect the information related to request context 202 including the current location 214 dynamically and in real-time of the first device 102 detected within the geographic area 226. The unique distributed architecture of the present invention allows the first device 102 to efficiently and accurately detect the current location 214 of the user and transmit the request context 202 to the second device 106 through the communication path 104 for the carryover module 508 to generate the carryover result 306.

For example, the user request 204 can represent "sushi" and the retry request 304 can represent "Jiro." Without factoring the current location 214, the carryover module 508 can generate the carryover result 306 of "Jiro Sushi" in Ginza area and Roppongi area of Tokyo. However, if the current location 214 is detected in Ginza area, the carryover module 508 can generate the carryover result 306 including the "Jiro Sushi" in Ginza along with other sushi restaurants in Ginza. Moreover, the carryover module 508 can exclude the "Jiro Sushi" in Roppongi area in addition to sushi restaurants in Roppongi area based on the current location 214.

It has been discovered that the navigation system 100 generating the carryover result 306 based on considering the request context 202 for the current location 214 improves the efficiency and accuracy of generating the carryover result 306 relevant for the user at the current location 214. By focusing on the current location 214, the navigation system 100 can improve the efficiency and accuracy for collecting information focused for the request context 202 at the current location 214 and not collecting information for the request context 202 unrelated of the current location 214. As a result, the unique distributed architecture of the present invention minimizes the impact on the communication path 104 and the navigation system 100 by reducing unnecessary network usage and resource allocation for improved operation of the navigation system 100.

For another example, the user profile 216 can represent a female user with an infant. The user request 204 can represent "hotel" and the retry request 304 can represent "baby." The carryover module 508 can generate the carryover result 306 including a list of hotels with the retry classification 308 of hotel having a good review for service related to travelers with babies based on the user profile 216. Moreover, the carryover module 508 can exclude the carryover result 306 having the retry classification 308 for hotels catered towards backpackers or business people based on the user profile 216.

For a different example, the time period 220 can represent midnight. The user request 204 can represent "ramen" and the retry request 304 can represent "pork." The carryover module 508 can generate the carryover result 306 with the retry classification 308 representing the pork based ramen noodle that is open at midnight for carrying over the user's intent 210 looking for pork based ramen.

For additional example, the user request 204 can represent "fast food" and the retry request 304 can represent "burger." The travel mode 224 can represent walking, which can be determined based on the travel speed 218 of FIG. 2 of the user with the first device 102. The search result 206 can include the request classification 212 representing fast food restaurants with or without a drive-through for people traveling with the travel mode 224 representing a vehicle or walking. Based on the travel mode 224, the carryover module 508 can determine the carryover result 306 including the retry classification 308 of "burger" without the drive-through. Moreover, the carryover module 508 can exclude the hamburger fast food restaurant with the drive-through to adjust the carryover result 306 with the travel mode 224.

More specifically as an example, the carryover module 508 can collect the information related to request context 202 for the travel speed 218 dynamically and in real-time of the first device 102 detected within the geographic area 226. The unique distributed architecture of the present invention allows the first device 102 to efficiently and accurately detect the travel speed 218 of the user and transmit the request context 202 to the second device 106 through the communication path 104 for the carryover module 508 to generate the carryover result 306 and reduce unnecessary network usage and system resource allocation.

For a different example, the user request 204 can represent "fine dining" and the retry request 304 can represent "Europe." The activity history 222 can indicate that user had expressed positive review for French cuisine. The carryover module 508 can generate carryover result 306 including the retry classification 308 representing French restaurant based on the activity history 222.

The carryover module 508 can generate the carryover result 306 based on the carryover context 302. The carryover context 302 can include the travel distance 310 of FIG. 3, the carryover distance 312 of FIG. 3, the idle period 314 of FIG. 3, the carryover period 316 of FIG. 3, or a combination thereof.

For example, the carryover module 508 can generate the carryover result 306 based on the travel distance 310 meeting, exceeding, or below the carryover distance 312. For a specific example, the user can make the retry request 304 after traveling the travel distance 310 of 10 kilometers and making the user request 204. The carryover distance 312 can represent 20 kilometers. Since the travel distance 310 is under the carryover distance 312, the carryover module 508 can determine that the user still prefers the carryover result 306 instead of starting over with the search result 206 to carryover the user's intent 210. As a result, the carryover module 508 can generate the carryover result 306 based on the travel distance 310 is below the carryover distance 312.

For further example, the carryover module 508 can generate the carryover result 306 based on the request context 202 when the user request 204 was made if the travel distance 310 is below the carryover distance 312 to carryover the user's intent 210. More specifically as an example, the carryover module 508 can generate the carryover result 306 based on the geographic area 226 of where the user request 204 was made instead of the current location 214. The geographic area 226 where the user request 204 was made can be different from the current location 214.

For a specific example, the geographic area 226 when the user request 204 was made was in Ginza area. The current location 214 can represent Ueno area. The travel distance 310 can be below the carryover distance 312. The carryover module 508 can generate the carryover result 306 based on the Ginza area instead of the Ueno area to carryover the user's intent 210 from the Ginza area.

In contrast, the carryover module 508 can transmit the retry request 304 to the request module 502 to reset the control flow if the travel distance 310 meets or exceeds the carryover distance 312. Moreover, the search module 504 can generate the search result 206 based on the retry request 304 since the carryover module 508 determined that the carryover result 306 is no longer requested based on the travel distance 310 meeting or exceeding the carryover distance 312. More specifically as an example, the search result 206 generated based on the travel distance 310 meeting or exceeding the carryover distance 312 can be different from the carryover result 306 generated based on the travel distance 310 below the carryover distance 312.

It has been discovered that the navigation system 100 generating the carryover result 306 based on the considering the carryover context 302 by comparing the travel distance 310 and carryover distance 312 improves the efficiency and accuracy of generating the carryover result 306 relevant for the user. By comparing the travel distance 310 and carryover distance 312, the navigation system 100 can improve the efficiency and accuracy for collecting information focused for the request context 202 relevant to the user's intent 210 and not collecting information for the request context 202 no longer desired. As a result, the unique distributed architecture of the present invention minimizes the impact on the communication path 104 and the navigation system 100 by reducing unnecessary network usage and resource allocation for improved operation of the navigation system 100.

For example, the carryover module 508 can generate the carryover result 306 based on the idle period 314 meeting, exceeding, or below the carryover period 316. For a specific example, the user can make the retry request 304 after the idle period 314 of 10 minutes and making the user request 204. The carryover period 316 can represent 20 minutes. Since the idle period 314 is under the carryover period 316, the carryover module 508 can determine that the user still prefers the carryover result 306 instead of the search result 206 to carryover the user's intent 210. As a result, the carryover module 508 can generate the carryover result 306 based on the idle period 314 is below the carryover period 316.

For further example, the carryover module 508 can generate the carryover result 306 based on the request context 202 when the user request 204 was made if the idle period 314 is below the carryover period 316 to carryover the user's intent 210. More specifically as an example, the carryover module 508 can generate the carryover result 306 based on the geographic area 226 of where the user request 204 was made instead of the current location 214. The geographic area 226 where the user request 204 was made can be different from the current location 214.

For a specific example, the geographic area 226 when the user request 204 was made was in Ginza area. The current location 214 can represent Ueno area. The idle period 314 can be below the carryover period 316. The carryover module 508 can generate the carryover result 306 based on the Ginza area instead of the Ueno area to carryover the user's intent 210 from the Ginza area.

In contrast, the carryover module 508 can transmit the retry request 304 to the request module 502 to reset the control flow if the idle period 314 meets or exceeds the carryover period 316. Moreover, the search module 504 can generate the search result 206 based on the retry request 304 since the carryover module 508 determined that the carryover result 306 is no longer requested based on the idle period 314 meeting or exceeding the carryover period 316. More specifically as an example, the search result 206 generated based on the idle period 314 meeting or exceeding the carryover period 316 can be different from the carryover result 306 generated based on the idle period 314 below the carryover period 316.

It has been discovered that the navigation system 100 generating the carryover result 306 based on the considering the carryover context 302 by comparing the idle period 314 and carryover period 316 improves the efficiency and accuracy of generating the carryover result 306 relevant for the user. By comparing the idle period 314 and carryover period 316, the navigation system 100 can improve the efficiency and accuracy for collecting information focused for the request context 202 relevant to the user's intent 210 and not collecting information for the request context 202 no longer desired. As a result, the unique distributed architecture of the present invention minimizes the impact on the communication path 104 and the navigation system 100 by reducing unnecessary network usage and resource allocation for improved operation of the navigation system 100.

For additional example, the carryover module 508 can generate the carryover result 306 based on the attribute priority 320, the carryover context 302, the request context 202, or a combination thereof. The attribute priority 320 can include the priority score 322 of FIG. 3 for each attribute for the carryover context 302, the request context 202, or a combination thereof as discussed above. Each of the priority score 322 can be the same or different based on the request context 202, the carryover context 302, or a combination thereof. For example, the attribute priority 320 for each factor can change by updating the priority score 322 dynamically and in real-time based on the change in the carryover context 302, the request context 202, or a combination thereof.

More specifically as an example, the carryover period 316 can have a higher instance of the priority score 322 than the carryover distance 312. For a specific example, the travel distance 310 can be less than the carryover distance 312. However, the idle period 314 met or exceeded the carryover period 316. As a result, the carryover module 508 can reset the control flow for generating the search result 206 instead of the carryover result 306 as discussed above.

For a different example, the activity history 222 can have a higher instance of the priority score 322 than the user profile 216. The user profile 216 can indicate the user's preference for Chinese food. However, the activity history 222 can indicate that the user consistently selected cuisine other than Chinese food. As a result, the carryover module 508 can generate the carryover result 306 based on factoring the activity history 222 over the user profile 216 to include the cuisine other the Chinese food in the carryover result 306. Each factor of the carryover context 302, the request context 202, or a combination thereof have a higher or a lower instance of the priority score 322 over one another. The carryover module 508 can transmit the carryover result 306 to a suggestion module 510.

The navigation system 100 can include the suggestion module 510, which can be coupled to the carryover module 508. The suggestion module 510 generates the autosuggestion 324 of FIG. 3. For example, the suggestion module 510 can generate the autosuggestion 324 representing the carryover type 326 of FIG. 3 based on the carryover result 306, the retry classification 308, or a combination thereof.

The suggestion module 510 can generate the autosuggestion 324 in a number of ways. For example, the suggestion module 510 can generate the autosuggestion 324 representing the carryover type 326 including the carryover suggestion 328 of FIG. 3, the carryover category 330 of FIG. 3, or a combination thereof for presenting on the first device 102 of FIG. 1.

For a specific example, the suggestion module 510 can generate the carryover suggestion 328 based on the carryover result 306, the retry request 304, or a combination thereof. More specifically as an example, the suggestion module 510 can generate the carryover suggestion 328 while the user enters the user request 204, the retry request 304, or a combination thereof. As the user request 204 or the retry request 304 is made, the suggestion module 510 can generate the carryover suggestion 328 according to the carryover result 306 generated by the carryover module 508.

For a different example, the suggestion module 510 can generate the carryover category 330 based on the retry classification 308, the retry request 304, or a combination thereof. More specifically as an example, the suggestion module 510 can generate the carryover category 330 while the user enters the user request 204, the retry request 304, or a combination thereof. As the user request 204 or the retry request 304 is made, the suggestion module 510 can generate the carryover category 330 according to the retry classification 308 determined by the retry module 506.

For additional example, the suggestion module 510 can generate the suggestion list 332 of FIG. 3 including multiple various instances of the autosuggestion 324. More specifically as an example, the suggestion module 510 can generate the suggestion list 332 including multiple instances of the carryover suggestion 328, the carryover category 330, or a combination thereof based on the request context 202, the carryover context 302, or a combination thereof.

For a specific example, based on the travel speed 218, the suggestion module 510 can update the suggestion list 332 dynamically and in real-time for controlling the number of instances of the carryover suggestion 328, the carryover category 330, or a combination thereof to be presented to the user on first device 102. More specifically as an example, as inversely correlated, the suggestion module 510 can increase the number of the instances of the autosuggestion 324 as the travel speed 218 decreases and decrease the number of the instances of the autosuggestion 324 as the travel speed 218 increases to be presented on or by the first device 102.

For another example, based on the activity history 222, the user profile 216, or a combination thereof, the suggestion module 510 can update the suggestion list 332 dynamically and in real-time for controlling the number of instances of the carryover suggestion 328, the carryover category 330, or a combination thereof to be presented on the first device 102. For a specific example, the user profile 216 can indicate that user has interest in traveling abroad. The activity history 222 can indicate the places that the user had visited. Based on whether the geographic area 226 had been visited or not, the suggestion module 510 can increase or decrease the number of the instances of the autosuggestion 324. More specifically as an example, for the places that the user had never been, the suggestion module 510 can increase the number of the autosuggestion 324 to introduce more options. In contrast, for the places that the user had frequented before, the suggestion module 510 can decrease the number of the autosuggestion 324 as the user may not require additional information. The umber of the autosuggestion 324 presented can differ based on the difference in the activity history 222 for the geographic area 226.

For a different example, the suggestion module 510 can update the suggestion list 332 based on the carryover context 302. More specifically as an example, the suggestion module 510 can adjust the suggestion list 332 dynamically and in real-time for controlling the number of instances of the carryover suggestion 328, the carryover category 330, or a combination thereof to be presented based on the difference level 318 of FIG. 3 between the travel distance 310 and the carryover distance 312, the idle period 314 and the carryover period 316, or a combination thereof.

For a specific example, the suggestion module 510 can decrease the number of the autosuggestion 324 to be presented as the difference level 318 between the travel distance 310 and the carryover distance 312 or between the idle period 314 and the carryover period 316 decreases. The difference level 318 decreases as the values between the travel distance 310 and the carryover distance 312 decrease or as the values between the idle period 314 and the carryover period 316 decreases.

In contrast, the suggestion module 510 can increase the number of the autosuggestion 324 to be presented as the difference level 318 between the travel distance 310 and the carryover distance 312 or between the idle period 314 and the carryover period 316 increases. The difference level 318 increases as the values between the travel distance 310 and the carryover distance 312 increases or as the values between the idle period 314 and the carryover period 316 increases. The suggestion module 510 transmits the autosuggestion 324, the suggestion list 332, or a combination thereof to a presentation module 512, a request module 502, or a combination thereof.

The navigation system 100 can include the presentation module 512, which can be coupled to the suggestion module

510. The presentation module 512 presents the content entered by the user, generated by the navigation system 100, or a combination thereof. For example, the presentation module 512 can display the user request 204, the retry request 304, the search result 206, the carryover result 306, the autosuggestion 324, the suggestion list 332, or a combination thereof.

The presentation module 512 can present in a number of ways. For example, the presentation module 512 can display the search result 206, the carryover result 306, or a combination thereof generated by the navigation system 100. For a different example, the presentation module 512 can display the autosuggestion 324 as the retry request 304 is entered by the user. More specifically as an example, the presentation module 512 can update the display of the autosuggestion 324 dynamically and in real-time as the user enters each letter.

For a different example, the presentation module 512 can display the suggestion list 332 in a complete phrase represented by combination of multiple instances of the keyword 208. More specifically as an example, the presentation module 512 can change the coloration 336 of FIG. 3 dynamically and in real-time as each letter as being typed for the user request 204, the retry request 304, or a combination thereof. For example, for the non-typed letter of the complete phrase of the autosuggestion 324 presented in the suggestion list 332, the coloration 336 can be originally in the color gray. As the user enters the letter, the presentation module 512 can change the coloration 336 dynamically and in real-time for each matching letter being typed from gray to black for example.

For a different example, the presentation module 512 can display the suggestion list 332 based on the suggestion ranking 334 of FIG. 3. More specifically as an example, the presentation module 512 can display each instance of the autosuggestion 324 in different instance of the coloration 336 according to the suggestion ranking 334. The suggestion ranking 334 can be determined based on the request context 202 including the user profile 216. For example, the user profile 216 can indicate the user's preference of which cuisine he or she prefers. The presentation module 512 can display the suggestion list 332 of cuisines where each of the autosuggestion 324 having different instance of the coloration 336 from one another.

It has been discovered that the navigation system 100 displaying the autosuggestion 324, the suggestion list 332, or a combination thereof in different instances of the coloration 336 improves the display function of the navigation system 100. By updating the coloration 336 dynamically in real-time, the ability of the navigation system 100 to display information improves as each instance of the autosuggestion 324, the suggestion list 332, or a combination thereof can be distinguished from one another.

The physical transformation from presenting the search result 206, the carryover result 306, the autosuggestion 324, the suggestion list 332, or a combination thereof results in the movement in the physical world, such as people using the first device 102, the vehicle, or a combination thereof, based on the operation of the navigation system 100. As the movement in the physical world occurs, the movement itself creates additional information that is transformed from physical aspect to digital data for further determination of the request context 202, the carryover context 302, the retry classification 308, the carryover result 306, the autosuggestion 324, the suggestion list 332, or a combination thereof for the continued operation of the navigation system 100 and to continue the movement in the physical world.

The first software 426 of FIG. 4 of the first device 102 of FIG. 4 can include the modules for the navigation system 100. For example, the first software 426 can include the request module 502, the search module 504, the retry module 506, the carryover module 508, the suggestion module 510, and the presentation module 512. The first control unit 412 of FIG. 4 can execute the modules to perform the functions dynamically and in real-time.

The first control unit 412 can execute the first software 426 for the request module 502 to determine the request classification 212. The first control unit 412 can execute the first software 426 for the search module 504 to generate the search result 206. The first control unit 412 can execute the first software 426 for the retry module 506 to determine the retry classification 308.

The first control unit 412 can execute the first software 426 for the carryover module 508 to generate the carryover result 306. The first control unit 412 can execute the first software 426 for the suggestion module 510 to generate the autosuggestion 324, the suggestion list 332, or a combination thereof. The first control unit 412 can execute the first software 426 for the presentation module 512 to present the search result 206, the carryover result 306, the user request 204, the retry request 304, the autosuggestion 324, the suggestion list 332, or a combination thereof.

The second software 442 of FIG. 4 of the first device 102 of FIG. 4 can include the modules for the navigation system 100. For example, the second software 442 can include the request module 502, the search module 504, the retry module 506, the carryover module 508, the suggestion module 510, and the presentation module 512. The second control unit 434 of FIG. 4 can execute the modules to perform the functions dynamically and in real-time.

The second control unit 434 can execute the second software 442 for the request module 502 to determine the request classification 212. The second control unit 434 can execute the second software 442 for the search module 504 to generate the search result 206. The second control unit 434 can execute the second software 442 for the retry module 506 to determine the retry classification 308.

The second control unit 434 can execute the second software 442 for the carryover module 508 to generate the carryover result 306. The second control unit 434 can execute the second software 442 for the suggestion module 510 to generate the autosuggestion 324, the suggestion list 332, or a combination thereof. The second control unit 434 can execute the second software 442 for the presentation module 512 to present the search result 206, the carryover result 306, the user request 204, the retry request 304, the autosuggestion 324, the suggestion list 332, or a combination thereof.

The modules of the navigation system 100 can be partitioned between the first software 426 and the second software 442. The second software 442 can include the request module 502, the search module 504, the retry module 506, the carryover module 508, and the suggestion module 510. The second control unit 434 can execute modules partitioned on the second software 442 as previously described.

The first software 426 can include the presentation module 512. Based on the size of the first storage unit 414, the first software 426 can include additional modules of the navigation system 100. The first control unit 412 can execute the modules partitioned on the first software 426 as previously described.

It has been discovered that the navigation system 100 having different configuration of a distributed architecture to actuate each module on the first device 102 or the second device 106 enhances the capability to determine the request context 202, the carryover context 302, or a combination thereof. By having the distributed architecture, the navigation system 100 can enable load distribution to receive the information related to the request context 202, the carryover context 302, or a combination thereof to reduce congestion in bottleneck in the communication path 104 and enhance the capability of the navigation system 100. As a result, the navigation system 100 can improve the performance to control the traffic flow for presenting the autosuggestion 324, the suggestion list 332, or a combination thereof for safer operation of the first device 102, the vehicle, or a combination thereof.

The first control unit 412 can operate the first communication unit 416 of FIG. 4 to transmit the search result 206, the carryover result 306, the user request 204, the retry request 304, the autosuggestion 324, the suggestion list 332, the request context 202, the carryover context 302, the request classification 212, the retry classification 308, or a combination thereof to or from the second device 106 through the communication path 104. The first control unit 412 can operate the first software 426 to operate the location unit 420. The second control unit 434 can operate the second communication unit 436 of FIG. 4 to transmit the search result 206, the carryover result 306, the user request 204, the retry request 304, the autosuggestion 324, the suggestion list 332, the request context 202, the carryover context 302, or a combination thereof to or from the first device 102 through the communication path 104.

The navigation system 100 describes the module functions or order as an example. The modules can be partitioned differently. For example, the retry module 506 and the carryover module 508 can be combined. Each of the modules can operate individually and independently of the other modules. Furthermore, data generated in one module can be used by another module without being directly coupled to each other. For example, the carryover module 508 can receive the request classification 212 from the request module 502. Further, one module transmitting to another module can represent one module communicating, sending, receiving, or a combination thereof the data generated to or from another module.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules. Furthermore, the first control unit 412, the second control unit 434, or a combination thereof can be implemented as software, hardware, or a combination thereof.

The modules described in this application can be implemented as instructions stored on a non-transitory computer readable medium to be executed by the first control unit 412, the second control unit 434, or a combination thereof. The non-transitory computer medium can include the first storage unit 414, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
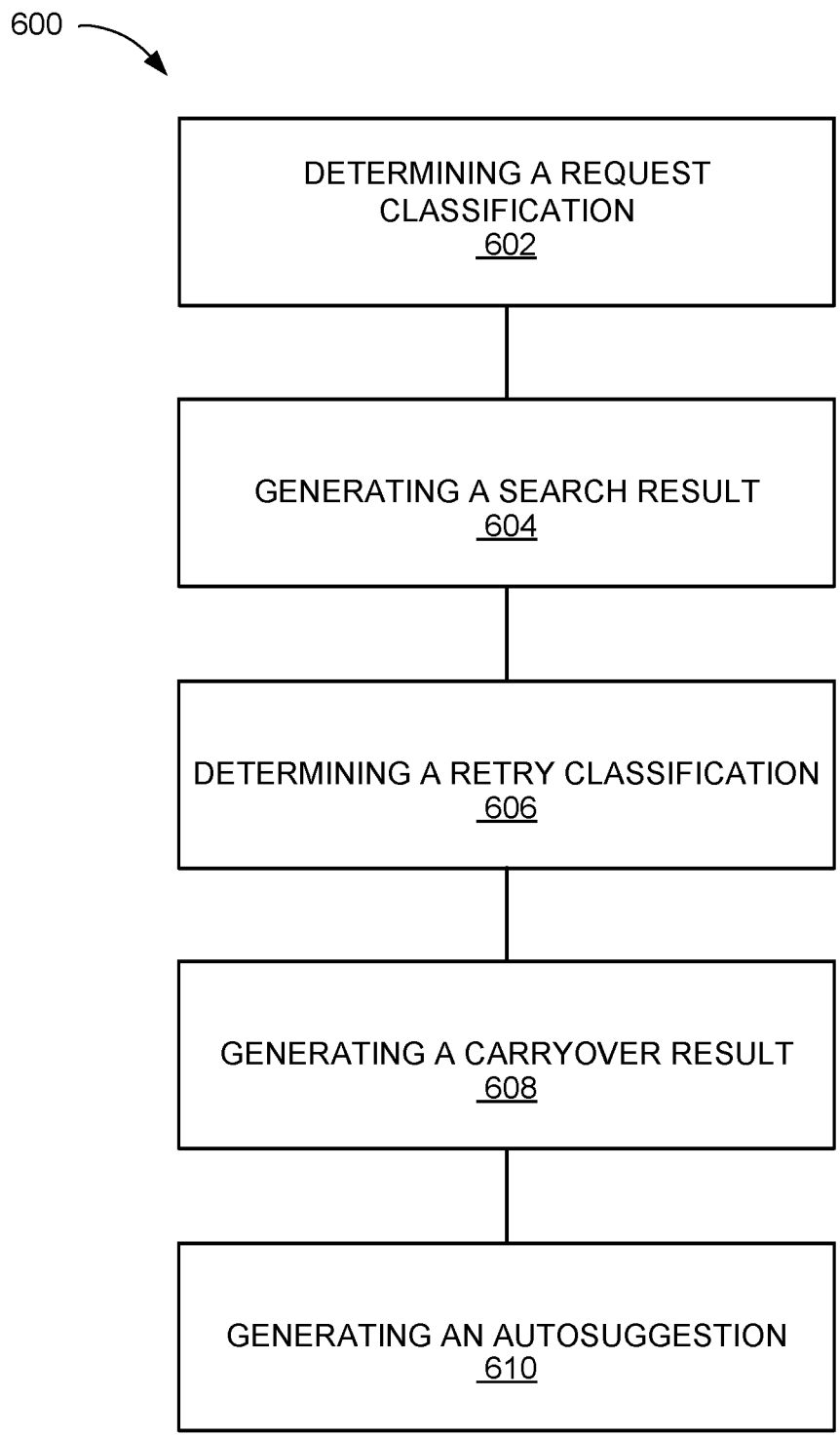
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a request classification based on a keyword included in a user request in a block 602; generating a search result including the request classification with a control unit for presenting on a device in a block 604; determining a retry classification based on the keyword included in a retry request in a block 606; generating a carryover result based on the retry classification, the request classification, or a combination thereof to carryover a user's intent from the user request to correlate the carryover result with the search result in a block 608; and generating an autosuggestion based on the carryover result for presenting on the device in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a request classification based on a keyword included in a user request;
    generating a search result including the request classification with a control unit for presenting on a device;
    determining a retry classification based on the keyword included in a retry request;
    generating a carryover result based on an attribute priority, the retry classification, the request classification, or a combination thereof to carryover a user's intent from the user request to correlate the carryover result with the search result wherein the attribute priority includes a priority score of a carryover period higher than the priority score of a carryover distance;
    generating an autosuggestion based on the carryover result; and
    enabling a load distribution based on actuating a hardware module for presenting the autosuggestion on the device wherein a number of instances of the autosuggestion presented increases when a travel speed is decreased and the number of instances of the autosuggestion presented decreases when the travel speed is increased.

2. The method as claimed in claim 1 further comprising displaying a suggestion list including each instance of the autosuggestion having a coloration different from one another.

3. The method as claimed in claim 1 wherein generating the carryover result includes generating the carryover result based on a carryover context by comparing a travel distance to the carryover distance for determining whether to carryover the user's intent.

4. The method as claimed in claim 1 wherein generating the carryover result includes generating the carryover result based on a carryover context by comparing an idle period to the carryover period for determining whether to carryover the user's intent.

5. The method as claimed in claim 1 wherein generating the carryover result includes generating the carryover result based on the request classification different from the retry classification for carrying over the user's intent.

6. The method as claimed in claim 1 wherein generating the carryover result includes generating the carryover result based on the keyword included in the retry request different from the keyword included in the user request for carrying over the user's intent.

7. The method as claimed in claim 1 wherein generating the carryover result includes generating the carryover result based on the attribute priority of each instance of a request context having a priority score different from one another.

8. The method as claimed in claim 1 wherein generating the carryover result includes generating the carryover result based on the attribute priority of each instance of a carryover context having a priority score different from one another.

9. The method as claimed in claim 1 wherein generating the autosuggestion includes generating a carryover category based on the retry classification for carryover the user's intent for a category of interest.

10. The method as claimed in claim 1 further comprising changing a coloration of the autosuggestion as the retry request is being entered.

11. A navigation system comprising:
a control unit for:
determining a request classification based on a keyword included in a user request;
generating a search result including the request classification with a control unit for presenting on a device;
determining a retry classification based on the keyword included in a retry request;
generating a carryover result based on an attribute priority, the retry classification, the request classification, or a combination thereof to carryover a user's intent from the user request to correlate the carryover result with the search result wherein the attribute priority includes a priority score of a carryover period higher than the priority score of a carryover distance;
generating an autosuggestion based on the carryover result;
enabling a load distribution based on actuating a hardware module; and
a communication unit, coupled to the control unit, for transmitting the autosuggestion based on the load distribution for presenting on the device wherein a number of instances of the autosuggestion presented increases when a travel speed is decreased and the number of instances of the autosuggestion presented decreases when the travel speed is increased.

12. The system as claimed in claim 11 wherein the control unit is for displaying a suggestion list including each instance of the autosuggestion having a coloration different from one another.

13. The system as claimed in claim 11 wherein the control unit is for generating the carryover result based on a carryover context by comparing a travel distance to the carryover distance for determining whether to carryover the user's intent.

14. The system as claimed in claim 11 wherein the control unit is for generating the carryover result based on a carryover context by comparing an idle period to the carryover period for determining whether to carryover the user's intent.

15. The system as claimed in claim 11 wherein the control unit is for generating the carryover result based on the request classification different from the retry classification for carrying over the user's intent.

16. A non-transitory computer readable medium including instructions for execution, the instructions comprising:
determining a request classification based on a keyword included in a user request;
generating a search result including the request classification for presenting on a device;
determining a retry classification based on the keyword included in a retry request;
generating a carryover result based on, an attribute priority, the retry classification, the request classification, or a combination thereof to carryover a user's intent from the user request to correlate the carryover result with the search result; wherein the attribute priority includes a priority score of a carryover period higher than the priority score of a carryover distance;
generating an autosuggestion based on the carryover result;
enabling a load distribution based on actuating a hardware module for presenting the autosuggestion on the device wherein a number of instances of the autosuggestion presented increases when a travel speed is decreased and the number of instances of the autosuggestion presented decreases when the travel speed is increased.

17. The non-transitory computer readable medium as claimed in claim 16 further comprising displaying a suggestion list including each instance of the autosuggestion having a coloration different from one another.

18. The non-transitory computer readable medium as claimed in claim 16 wherein generating the carryover result includes generating the carryover result based on a carryover context by comparing a travel distance to the carryover distance for determining whether to carryover the user's intent.

19. The non-transitory computer readable medium as claimed in claim 16 wherein generating the carryover result includes generating the carryover result based on a carryover context by comparing an idle period to the carryover period for determining whether to carryover the user's intent.

20. The non-transitory computer readable medium as claimed in claim 16 wherein generating the carryover result includes generating the carryover result based on the request classification different from the retry classification for carrying over the user's intent.

* * * * *